United States Patent
Sisson

[11] Patent Number: 5,513,866
[45] Date of Patent: May 7, 1996

[54] RETRACTABLE STEP

[76] Inventor: Daniel R. Sisson, 6938 Tantara Estates, Osage Beach, Mo. 65065

[21] Appl. No.: 248,449

[22] Filed: May 24, 1994

[51] Int. Cl.$^6$ ...................................... B60R 3/00
[52] U.S. Cl. .......................... 280/166; 105/449; 182/89; 182/91; 182/127
[58] Field of Search ..................... 280/166, 103, 280/164.1, 766.1, 765.1, 764.1, 291; 182/88, 89, 90, 91, 127; 296/62; 105/443, 447, 449

[56] References Cited

U.S. PATENT DOCUMENTS

| | | | |
|---|---|---|---|
| 2,647,677 | 8/1953 | Reed | 280/166 |
| 2,797,104 | 6/1957 | Drobney | 280/166 |
| 2,840,290 | 6/1958 | Roberts | 182/127 |
| 3,517,942 | 6/1970 | Cuffe et al. | 280/166 |
| 3,580,613 | 5/1971 | Northrop | 280/500 |
| 3,743,320 | 7/1973 | Clark | 280/166 |
| 3,779,580 | 12/1973 | Thelen | 280/164 |
| 4,200,303 | 4/1980 | Kelly | 280/166 |
| 4,231,583 | 11/1980 | Learn | 280/166 |
| 4,266,817 | 5/1981 | Mason et al. | 293/117 |
| 4,324,317 | 4/1982 | Winkelblech | 280/163 |
| 5,007,654 | 4/1991 | Sauber | 280/166 |
| 5,195,609 | 3/1993 | Ham | 280/166 |
| 5,228,707 | 6/1993 | Yoder | 182/88 |

OTHER PUBLICATIONS

J. C. Whitney Catalog 566J pp. 110, and 99.

Primary Examiner—Anne Marie Boehler
Attorney, Agent, or Firm—Richard J. Grundstrom

[57] ABSTRACT

A retractable step including at least a first and second tube member, a step platform and a retraction device. The first tube member is attached to the vehicle. The step platform is attached to one end of the second tube member. The second tube member, with the step platform, is slidable over the first tube attached to the vehicle. The retraction device provided a method of retracting the step platform from an in use lower position to an upper retracted position. An electric motor may be used to drive the retraction device.

13 Claims, 8 Drawing Sheets

RETRACTABLE STEP

BACKGROUND OF THE INVENTION

The present invention relates to a retractable step for use on pickup trucks, vans and other vehicles.

There are a variety of different designs and types of steps for use on trucks, vans and other vehicles. The most common is the step bumper and running boards, both of which have been in use for a long period of time. The step bumper typically provides a step on the top surface of the bumper. The bumper can also include areas or cutouts in the bumper to provide additional step positions or heights. One disadvantage is that the step bumper cannot be used when the tailgate of a pickup truck is down.

Other types of steps known in the art, bolt to the frame or other portions of the vehicle. These steps are usually rigidly attached in a fixed position. They can be one of any number of different shapes and designs including flattened tubes, metal plates or combinations of the two used as a step platform. One variation includes a step platform that pivots within a fixed bracket. The step can be locked in various positions. For the most part, most of these designs have a fixed step, which once mounted remains in a specific position.

One unique step for use on vans and other vehicles is a license plate step. The step platform is pivotally attached to the bumper with the license plate attached to the front surface of the step. The license plate and step platform is pivoted downward to provide a step. This design provides access to the windshield on vans and other high vehicles.

Also known are folding or pull out steps. These typically have some sort of scissor or folding action brackets. The scissor or folding brackets attach the step to the vehicle and allows positioning the step in a down position when the step is in use or an up position when the vehicle is in motion. Most of the steps of this design have to be manually positioned. One known design is equipped with an electric motor drive to automatically retract the step when the ignition is on. The brackets and the step of this design are typically not very rugged and are easily bent if care is not exercised.

One variation of the step bumper includes a central portion that pivots outward and down to provide an additional step. When pivoted outward the step portion is in a position lower than the top of the bumper. The pivoting portion can also include a ball for trailer pulling.

A trailer hitch that includes a tire carrier that folds down to provide a step is also known. The spare tire is mounted on the back surface of a step platform. The front of the platform provides the step when it is folded downward.

All these steps have certain advantages and disadvantages and each have specific uses and limitations. Most steps of the prior art cannot be used when the tailgate is in a down position or when the load extends beyond the end of the cargo bed. The steps of the prior art are typically located near doors or on the front or rear bumper. When using a pickup truck, the box is often entered from the rear corners where most of the prior steps could not be used or mounted. The side edges of the tailgate are usually used as a step in this case. The height of the tailgate is often high especially if the truck is a four-wheel drive or has large tires. The corner of the bumper may or may not be useful, depending on the particular setup. It may be too high, slippery, or under the tailgate. What is needed is a very rugged step. A step positioned so it can be used with the tailgate in an up or down position, and located in an area typically not accessible with the step of the prior art. The step in the side corners of a pickup would also have to be positioned as to not interfere with operation of the vehicle and provide clearance over obstacles.

The running board, fixed or rigid steps and some folding step can be and are used at the passenger doors of trucks, vans and other vehicles. Some of these designs interfere with height or side clearance of the vehicle. Others are not very rigid. The step and running boards at the side of vehicles are often in the way and are very often bent or damaged as the vehicle is being used. What is needed is a very rugged step that allows easy access into the passenger compartment. A step that is mounted in a non-interfering manner or one that retracts out of the way.

Accordingly, it is an object of the present invention to provide a retractable step adapted to be attached to a vehicle in any number of locations. With the retractable step of this invention it has been found that it can be mounted at the rear corner of a truck, van or other vehicle as well as near any door or other location on the vehicle.

Another object of the present invention is to provide an improved retractable step constructed to be very rugged that can withstand a wide range of abuses without damage.

A further object of the present invention is to provide a retractable step adapted to provide easy access to a bed of a pickup or into a passenger compartment of a vehicle.

Still another object of the present invention is to provide a retractable step that may be easily retracted in a non-interfering position either manually or automatically.

Still a further object of the present invention is to provide a retractable step adapted for installation in a wide range of different vehicles without significant differences in installation.

Yet another object of the present invention is to provide a retractable step that has the capability for simple removal and installation, such that the step may be removed for storage or transferred between vehicles.

SUMMARY OF THE INVENTION

To accomplish the foregoing and other objects of this invention there is provided a retractable step consisting of at least a first and second tube member, a step platform and a retraction means. The first tube member is attached to the vehicle. The step platform is attached to one end of the second tube member. The second tube member, with the step platform, is slidable over the first tube attached to the vehicle. The retraction means provided a method of retracting the step platform from an in use lower position to an upper retracted position.

There are two main embodiments of the retraction step herein described. The first embodiment has a second tube member having a first and second tube section. The first tube section has a first end cut at an angle forming an acute edge and obtuse edge. The second tube section also has a first end cut at an angle forming an acute edge and an obtuse edge. The acute edge of the first tube section and the acute edge of the second tube section is pivotally attached.

The second embodiment, the second tube member is basically a tube member with a first end and a second end. A slotted opening through opposite sides of the tube member extends between the ends. The first tube member is inserted within the slotted opening.

The retraction means slides the second tube member over the first tube member from a lower in use position to an upper retracted position. The retraction means can be manually or automatically operated. In the automatic version, an electric motor would operate to raise and lower the step platform.

The above mentioned and other objects and features of the present invention will be better understood and appreciated from the following detailed description of the main embodiment thereof, selected for purposes of illustration and shown in the accompanying drawings.

BRIEF DESCRIPTION OF THE DRAWINGS

FIG 2-A is an end view of one embodiment of the retractable step of this invention.

FIG. 5-A is a front view of the second embodiment of the retractable step.

FIG. 5-B is a top view of the second embodiment of the retractable step.

FIG. 5-C is a side view of the second embodiment of the retractable step.

DETAILED DESCRIPTION

Figure 1:
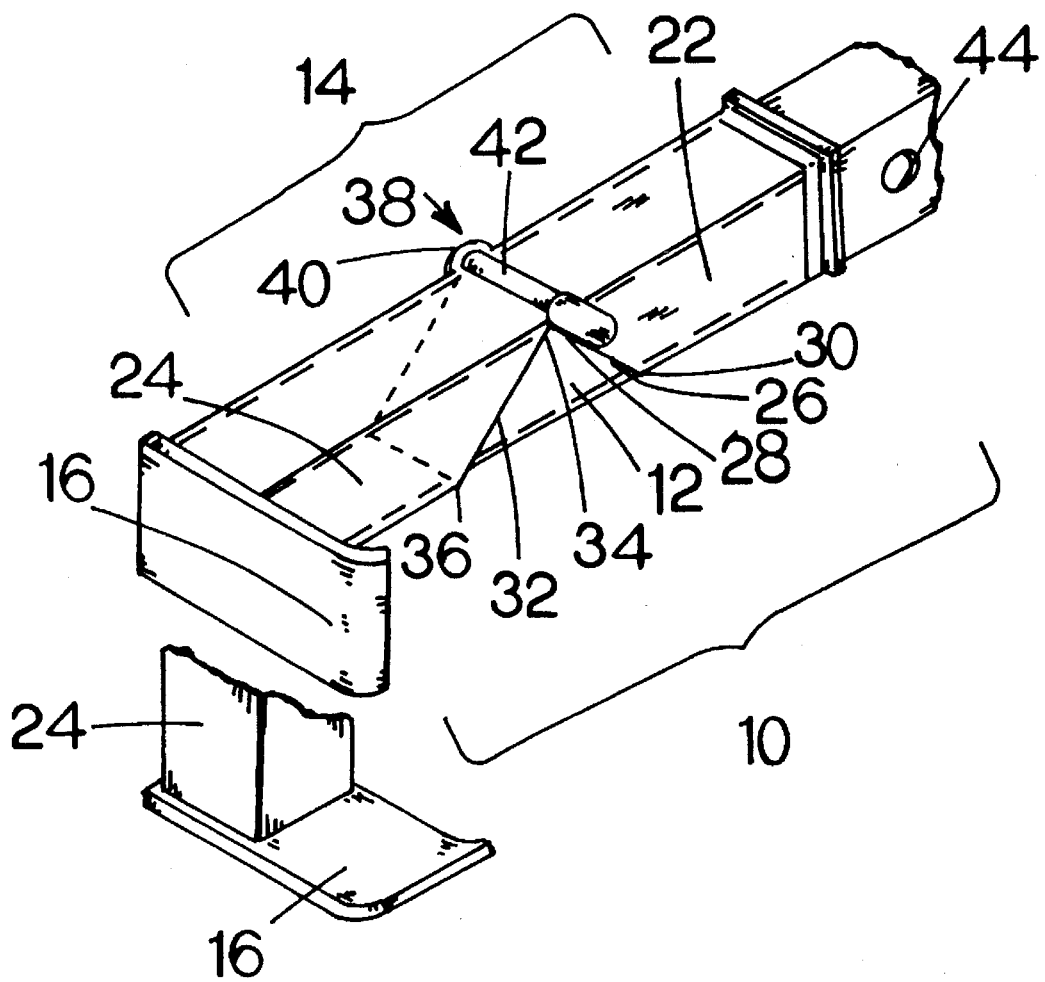
FIG. 1 provides an isometric view of one embodiment of the retractable step of this invention.

Referring now to the drawings in general there is shown the preferred embodiments for the retractable step 10 of this invention.

The retractable step 10 in the most basic form consists of a first tube member 12 attachable to a vehicle 8, a second tube member 14, a step platform 16 attached to an end 18 of the second tube member 14, and a means of retracting 20 the step platform 16 by sliding the second tube member 14 along the first tube member 12.

The preferred embodiment and the best mode contemplated of the retractable step 10 of the present invention are herein described. However, it should be understood that the best mode for carrying out the invention hereinafter described is offered by way of illustration and not by the way of limitation. It is intended that the scope of the invention includes all modifications that incorporate its principal design features.

The first tube member 12, in the preferred embodiment, is a square steel tube. The first tube member 12 is attachable to a vehicle. It can be attached in one of several means. In one embodiment shown in FIG. 1–4, the first tube member 12 is attached to the vehicle by sliding the first tube member 12 within a cross tube member of a trailer hitch. Generally, most if not all class II, III and IV trailer hitches have a cross member that traverses the rear of the vehicle. The cross member attaches to the frame on both sides of the vehicle. The cross member is typically a square steel tube that is open at both end. The first tube member 12 can easily be sized to fit within the cross member of most classes of hitches. Therefore, the retractable step 10 of this invention can be easily attached to any vehicle that has such a hitch.

In another embodiment, a mounting tube is used in place of the cross member of a trailer hitch. The mounting tube is typically a steel tube rigidly attached to the vehicle. The first tube member 12 is insertable into the end of the mounting tube, just as in the cross member. The advantage of the mounting tube is that it can be mounted almost anywhere on the vehicle 8. The mounting tube can be located near a door, by the rear or front ends or at a corner location. It is a very adaptable means of attaching the first tube member 12 to the vehicle 8.

In the embodiments described above, where the first tube member 12 is inserted into either a cross member of a hitch or into a mounting tube, a means to lock the first tube member 12 in a fixed position has to be provided. The easiest method and the preferred embodiment is to simply use a bolt 44 and nut 46. The bolt 44 would extend through the cross member or mounting tube and through the first tube member 12 within the mounting tube or cross member. This will secure and lock the first tube member 12 in a specific position. Hitch pins, latch pins and other devices may also be used without departing from the scope and spirit of this invention.

The advantage of the mounting tube and cross member is the removability of the retractable step 10. Using these methods of attachment makes installing, removing and changing the retractable step very easy and fast. The first tube member 12 only needs to be inserted into the open end and bolted in position. The process is reversed for removal.

The first tube member 12 can also be attached directly to the vehicle itself. In this embodiment, the first tube member 12 is rigidly attached, such as by bolting or welding, to the vehicle without use of the cross member or mounting tube. Depending on the particular application and embodiment, one or both ends will be attached. In one embodiment of the retractable step 12, shown in FIGS. 1–4, only one end can be attached. The embodiment shown in FIG. 5 and 6, both ends may be attached to the vehicle. In the later embodiment, a chassis mount 48 may also be utilized. The chassis mount 48 attaches to the bottom edge of the body or chassis of the vehicle 8. This type of mount is commonly used on running boards and other accessories attachable to a vehicle. The other end of the first tube member 12 may attach directly to the vehicle frame by bolts or welding, with or without additional bracketing, depending on the particular application and arrangement.

The advantage of this means of attachment is that the first tube member 12 is more rigidly attached to the vehicle 8 and therefore more stable. The disadvantage of this method is that once installed it is difficult to remove.

The second tube member 14 is generally slidable over the first tube member 12 in one way or another. In one embodiment, shown in FIGS. 1–4, the second tube member 14 comprises a first tube section 22 and second tube section 24. The first tube section 22 has a first end 26 cut at an angle forming an acute edge 28 and obtuse edge 30. The second tube section 24 also has a first end 32 cut at an angle forming an acute edge 34 and an obtuse edge 36. The acute edge 28 of the first tube section 22 and the acute edge 34 of the second tube section 24 are pivotally attached. The pivot means 38 in the preferred embodiment is a pin 42 inserted though bores located collars or tabs 40 extending outward from the acute edges 28 and 34. Any type of hinge or other pivot device could also be used without departing from the scope and spirit of the inventive concepts herein disclosed. The tube sections 22 and 24 pivots about the pivot means 38 such that the obtuse edges 26 and 26 can come into contact or near contact and the tube sections 22 and 24 are positioned perpendicular to each other. When the first and second tube sections 22 and 24 are parallel and aligned, the second tube member 14 will be completely slidable over the first tube member 12. When second tube section 24 is pivoted into a downward position and the tube sections 22 and 24 are perpendicular, only the first tube section 22 of the second tube member 14 will be slid over the first tube member 12.

Figure 5:
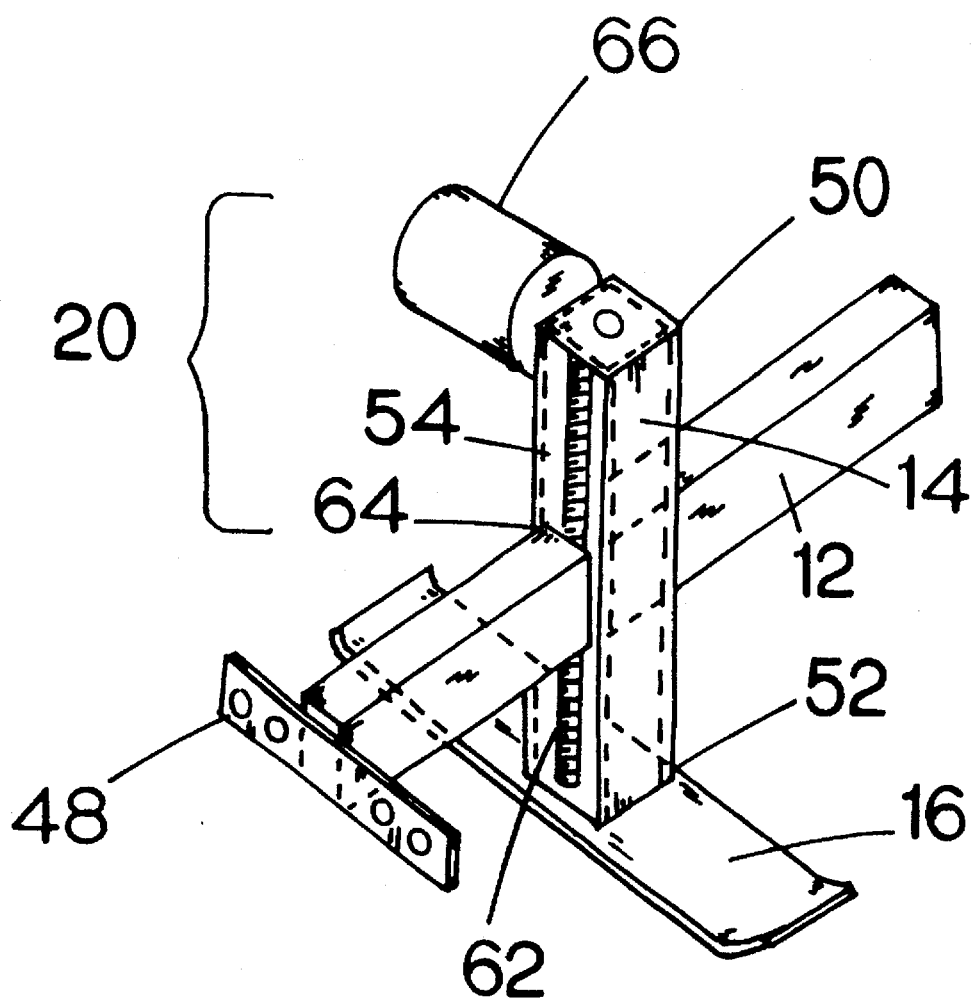
FIG. 5 is an isometric view of a second embodiment of the retractable step.
Figure 5A:
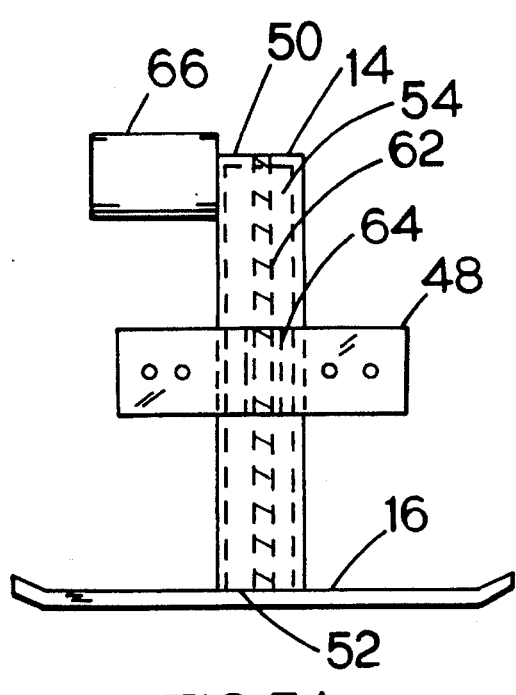
Figure 5B:
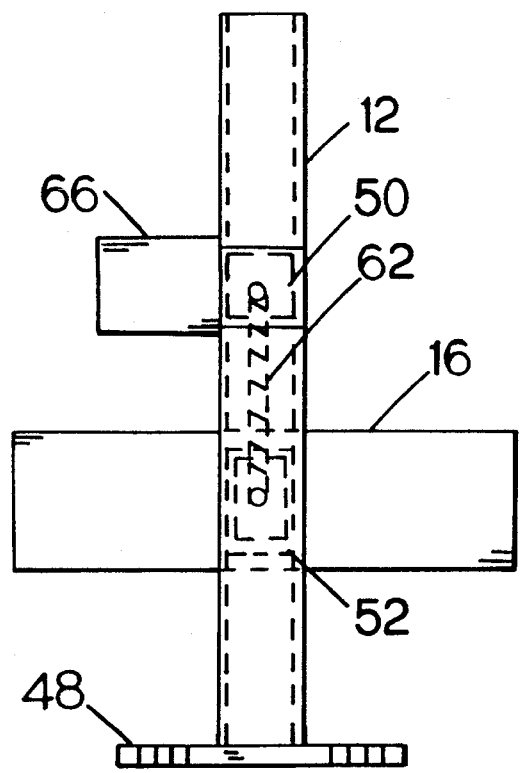
Figure 5C:
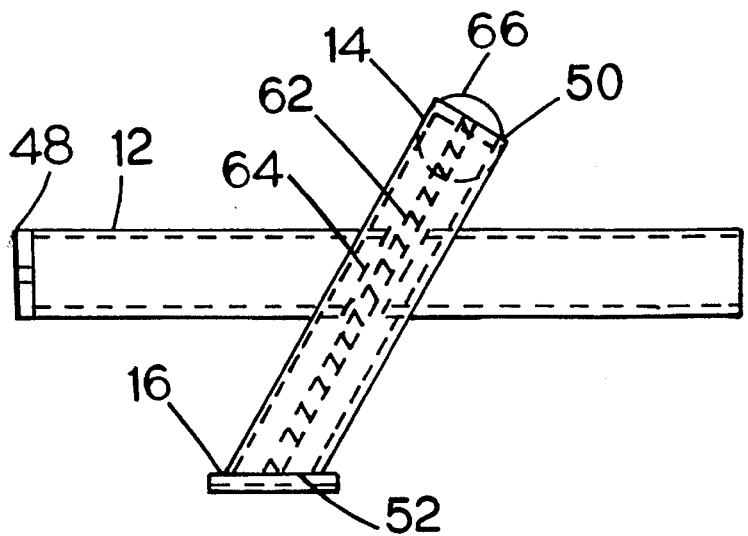
Figure 6:
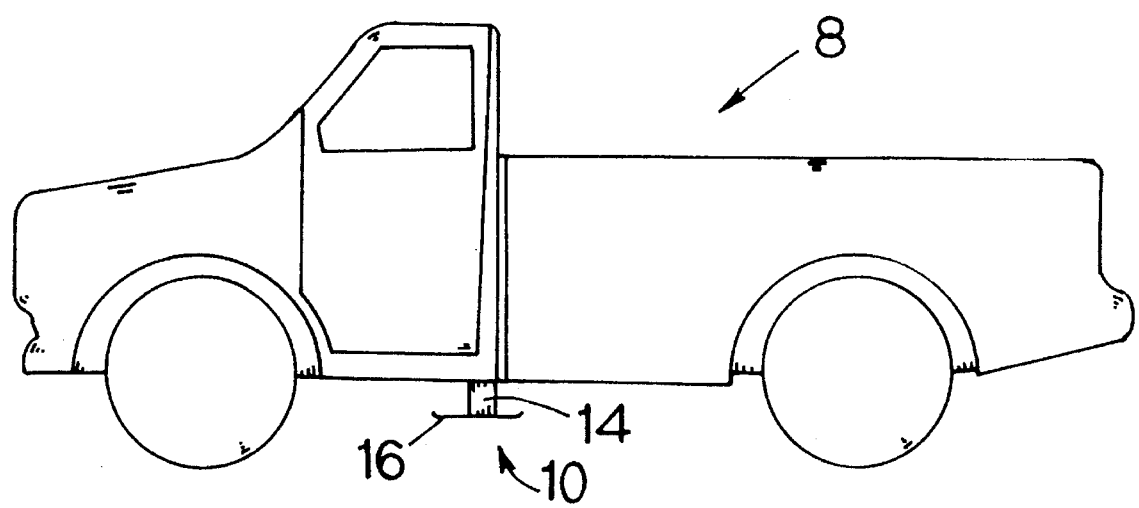
FIG. 6 is a view showing a typical location of a retractable step of the second embodiment on a pickup truck.

In a second embodiment shown in FIG. 5 and 6, the second tube member 14 has a first end 50 and a second end 52. A slotted opening 54 extends between the ends 50 and 52 through opposite sides of the tube material. The first tube member 12 is inserted through the slotted opening 54. The step platform is raised or lowered by sliding the second tube member 14 up or down on the first tube member 12.

The second tube member 14 in this embodiment can be made with square steel tubing. The slotted opening 54 would be cut through opposites sides of the tubing. The width of the slotted opening 54 would be selected in accordance with the width of the first tube member 12. The length of the slotted opening 54 would be determined by the desired travel distance of the step platform 16. Generally, the length will be close to the ends 50 and 52.

Another means of making the second tube member 14 would be to weld or otherwise attach parallel steel plates to the step platform 16 forming end 52. The plates would be positioned with an inside width approximately the outer width of the first tube member 12. The other end of the steel plates would be capped forming end 50.

The step platform 16 is attached to the end of the second tube member 14. In the first embodiment, the step platform 16 is attached to the end of the second tube section 24 opposite the cut first end 32. In the second embodiment, the step platform 16 is attached to end 52 of the second tube member 14.

The step platform 16 is typically made of steel plate material. It can be made in many different shapes without departing from the spirit and scope of the invention herein disclosed. In the preferred embodiment, it has a width slightly larger than the width of the second tube member 14. The length of the step platform 16 extending past the junction of the second tube member 14 and the step platform 16 will be approximately 5 or 6 inches. It will have sufficient length to serve the width of shoes or boots. The end may be slightly curled or bent upward to prevent someone from slipping off the end.

The step platform 16 can extend outward, perpendicular from the axis of the tube member 14, in one direction as shown in FIGS. 1–4 to provide a single step. Another option would be to have dual step in which the steps extend outward in opposite directions as shown in FIGS. 5 and 6. The step platform 16 having dual steps would be most useful to provide a step to get into the cab of a truck and to provide a step access to the box from a point near the door.

The retraction means 20 can be one of several different options. There can be manual retraction or automatic retraction depending on the application and specific embodiments desired. The embodiment shown in FIGS. 1–4 is a manual method, but could be automated by simply substituting various components. In the preferred embodiment shown in FIGS. 1–4, the retraction means 20 consists of a spring 56 and an attachment means 58. The positioning of the retraction means is very important for proper operation. The retractable step 10 will not retract if the retraction means 20 is not properly positioned.

Figure 2:
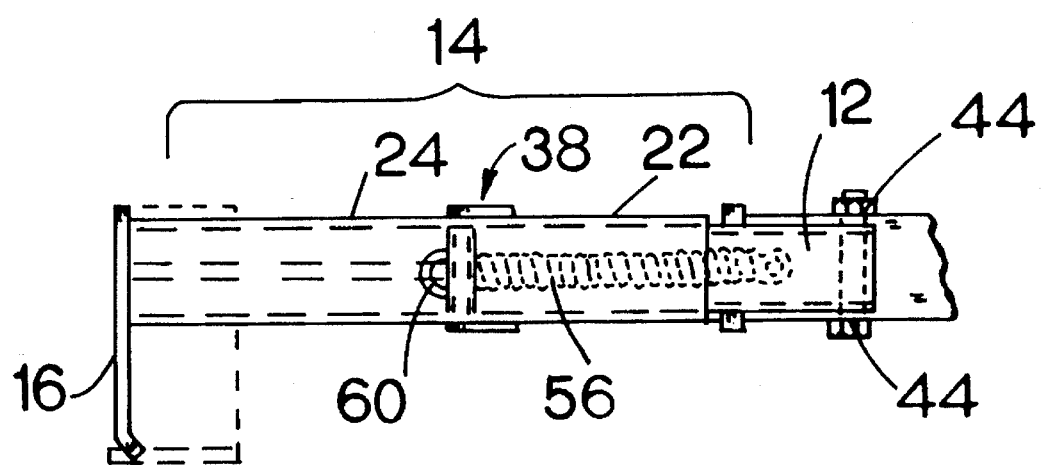
FIG. 2 is a top elevation view of the retractable step.
Figure 2A:
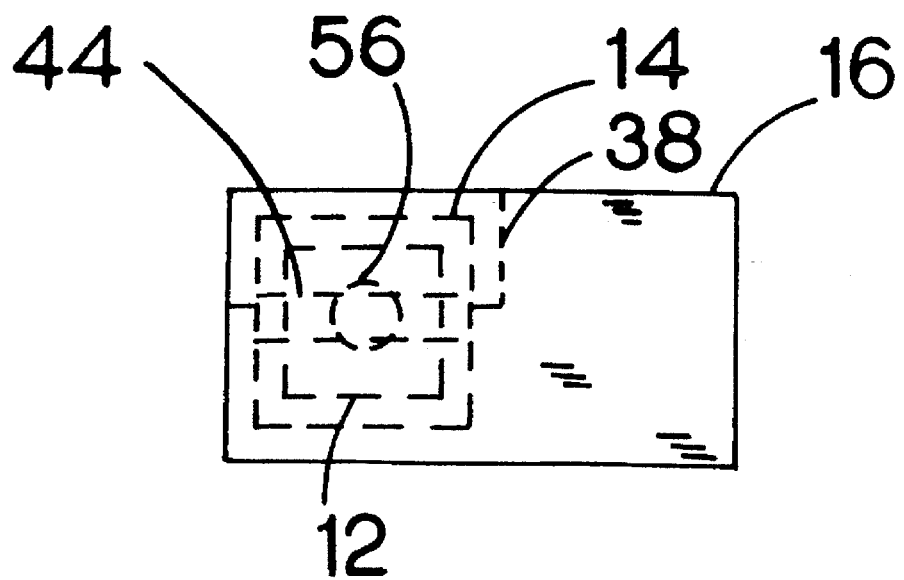
Figure 3:
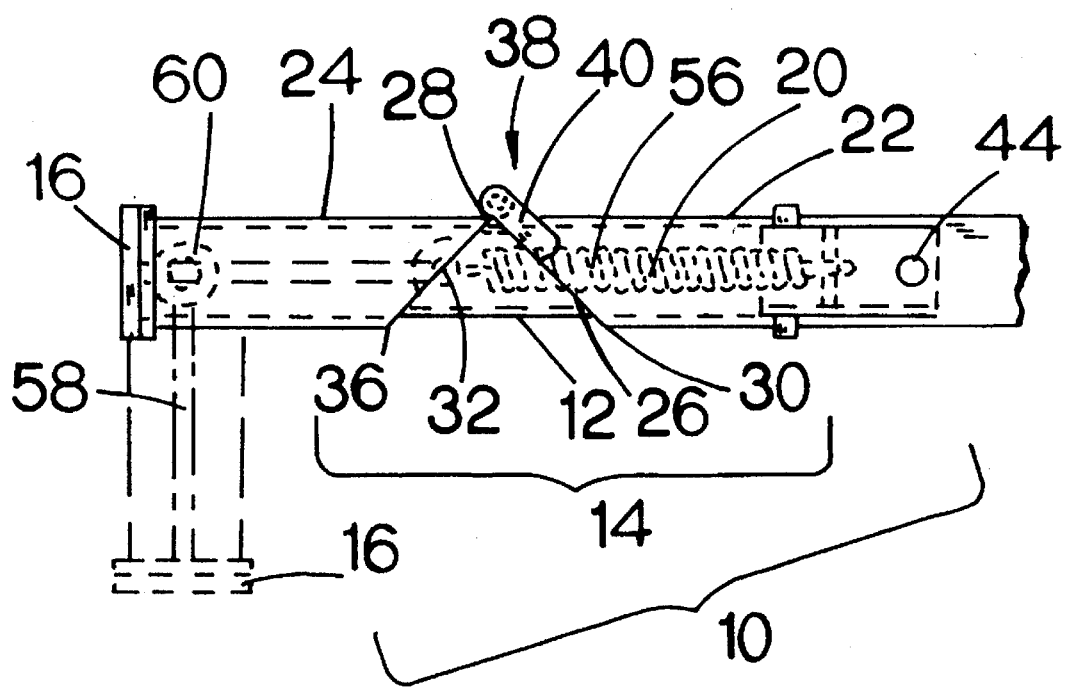
FIG. 3 is a side view elevation of the retractable step.
Figure 4:
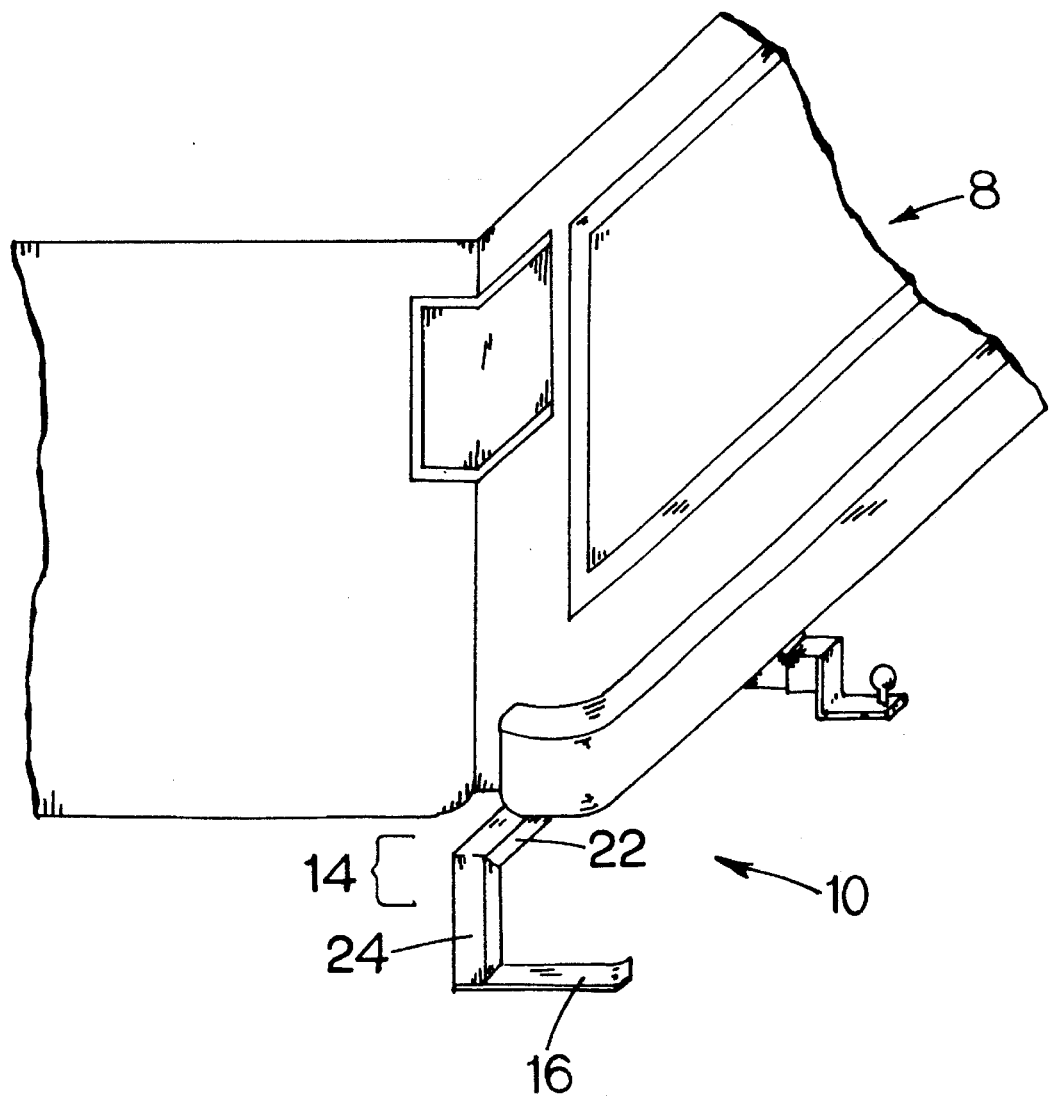
FIG. 4 is an isometric view showing a typical location for the retractable step.

The attachment means 58 illustrated in FIGS. 2 and 3, is an eyebolt (which is also referenced numerically as 58). The eyebolt 58 is welded or otherwise attached to the step platform 16 such that the eyebolt 58 extends into the second tube member 14. The position of the eye 60 must be positioned at a point between the acute edge 28 and the obtuse edge 36 of end 32 of the second tube section 24 for proper operation. One end of spring 56 is attached to the eye 60. The other end of the spring 56 is attached in any means known in the art, at a position within the first tube member 12. The position of the end of spring 56 within the first tube member 12 will be determined by characteristics of the spring. The spring must provide a bias to hold the second tube member 14 in a retracted position over the first tube member 12. In this position the end of the first tube member 12 butts against the step platform 16 attached to the end of the second tube member 14. The end of the first tube member 12 may be cut at an angle to provide clearance for the eyebolt 58 or other attachment means.

The retractable step 10, in this embodiment, is retracted by lifting the step platform 16 and pivoting the second tube section 24 until the first tube section 22 and the second tube section 24 is parallel and aligned. The spring will than provide a bias to pull the second tube member 14 over the first tube member 12. The spring 56 provides the bias to hold the step platform 16 in this retracted position. To lower the step platform 16, the step platform is pulled outward, overcoming the spring bias, until the second tube section 24 clears the end of the first tube section 12. Once cleared, the second tube section 24 is pivoted downward to an in use position. The end of the first tube section 12 will butt up against the inside of the second tube section 24 near the acute edge 28 at end 32. The obtuse edges 30 and 36 may come into contact or near contact when the step is in a lowered in use position.

The retraction means 20 could also include an electrically driven means that lifts the second tube section 24 from an in use position to a parallel and aligned position with the first tube section 22. The second tube member 14 would be pulled or slid over the first tube member 12 into the retracted position, just as with the bias from the spring. The electric motor drive could include a screw or worm drive extending between the first tube member 12 and the second tube member 14.

In the second embodiment with the slotted opening 54 in the second tube member 14, the retraction means 20 includes a rotatable threaded rod 62 extending between the first end 50 and the second end 52 within the slotted opening 54 of the second tube member 14. The rotatable threaded rod 62 is rotatably fixed in this position. When installed, the rotatable threaded rod 62 is threaded through a threaded bore 64 in the first tube member 12. The threaded bore 62 is located in a position determined by the desired location of the retractable step 10 and the second tube member 14.

As the rotatable threaded rod 62 rotates, the second tube member 14 slides up or down along the first tube member 12. This action retracts the step platform 16 in an upper retracted position or lowers the step platform 16 to a lowered in use position, depending on the direction of rotation.

The retraction means in this embodiment could also be made such that the second tube member 14 retracts and extends at an angle from the first tube member 12. To provide the retractable step 10 at an angle, the threaded bore 64 would be bored at the desired angle. The end 52 of the second tube member 14 would be cut at an angle to maintain the step platform in a horizontal position. This feature is beneficial to extend the step further outward from under the vehicle to positions the step platform 16 in a more useful position. The specific angles would be determined by the specific application.

The rotatable threaded rod 62 can be rotated by several different methods all of which are generally known in the art. The threaded rod 62 can be rotated by a hand crank or with an electric motor. The hand crank can be gear driven where the gear is rotated by the crank and the gear engages the threads of the threaded rod 62. The threaded rod 62 could also be connected directly to a hand crank without use of a gear.

Another and the preferred embodiment, an electric motor 66 is used to rotate the rotatable threaded rod 62. The electric motor 66 can be top mounted and connected directly to the threaded rod 62 or it can be side mounted. In the side mounted version, a gear would be typically turned by the electric motor 66. The gear, in engagement with the threads of the threaded rod 62, rotates the threaded rod 62 to raise and lower the second tube member 14 along first tube member 12. An electric control circuit with limit switches and operational switches would of course have to be included for proper operation. These types of circuits are commonly available and well known in the art.

The electric motor 66 enables the retraction and lowering of the step platform 16 to be automatic. In one embodiment, the retractable step 10 is connected to the door switch that enables the dome light. When the door is opened, the electric motor 66 operates to lower the step platform 16. When the ignition switch is "on" the step platform is automatically retracted. A separate electrically parallel switch could also be included to manually operate the step platform as desired.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A retractable step comprising:

a single first tube member rigidly attachable to the underside of a vehicle in a horizontal position;

a second tube member slidable over said first tube member, said second tube member comprises a first and second tube section, said first tube section having a first end cut at an angle forming an acute angle and obtuse angle, said second tube section having a first end cut at an angle forming an acute angle and an obtuse angle, a vertex of said acute angle of said first tube section and a vertex of said acute angle of said second tube section pivotally attached;

a step platform attached to an end of said second tube member; and a bias to secure and hold said second tube member in a retracted position and lowered position, said step platform being retracted by sliding said second tube member outward along said first tube member until said first end of said second tube section clears said first tube member, pivoting said second tube section upward to raise said step platform, said bias means pulling said second tube member inward to secure and hold said step in a retracted position; said step being lowered by sliding said second tube member outward along said first tube member until said second tube section clears said first tube member, pivoting said second tube section downward to lower said step platform, said bias means sliding said second tube member inward to secure and hold said step in a lowered position.

2. A retractable step comprising:

a first tube member having a first end and a second end, said second end attachable to a vehicle:

a second tube member slidable over said first end of said first tube member, having a first tube section and a second tube section, said first and second tube sections each having a first end cut at an angle forming an acute angle and obtuse angle;

a pivot means pivotally attaching a vertex of said acute angle of said first end of said first tube section and a vertex of said acute angle of said second tube section;

a step platform attached to a second end of said second tube section of said second tube member; and a means to retract said step from an in use position to a retracted position, said retraction means comprises a spring and an attachment means, said spring having a first and second end, said first end attached inside said first tube member and said second end attached to said attachment means, said attachment means attaching said second end of said spring to the inside of said second tube member at a point between said acute angle and said obtuse angle of said first end of said second tube section of said second tube member, to provide a bias to retract said retractable step when said second tube section of said second tube member is lifted from an in use position and aligned with said first tube section, said bias causing said second member to slide inward over said first tube member to said retracted position.

3. The retractable step as set forth in claim 2 in which said attachment means comprises an eye bolt attached to said step platform with an eye of said eye bolt extending through the insides of said second tube member to a point midway between said acute angle and said obtuse angle of said second tube section.

4. The retractable step as set forth in claim 2 in which said first tube member comprises square tubing sized to slide within a cross tube member of a trailer hitch attached to a vehicle.

5. The retractable step as set forth in claim 2 further comprising a mounting tube, said mounting tube being rigidly attachable to an underside of a vehicle, said second end of said first tube member being insertable into said mounting tube and secured in a fixed position to attach said retractable step to said vehicle.

6. A retractable step comprising:

a mounting tube, said mounting tube attachable to a vehicle;

a first tube member insertable within said mounting tube;

a means to lock said first tube member in a fixed position within said mounting tube with a portion of said first tube member extending outward from said mounting tube;

a second tube member slidable over said portion of said first tube member extending outward from said mounting tube, said second tube member comprising a first tube section and a second tube section, each of said tube sections having a first end cut at an angle forming an acute angle and obtuse angle;

a pivot means pivotally attaching vertexes of said acute angle of said first end of said first tube section and said acute angle of said second tube section;

a step platform attached to a second end of said second tube section of said second tube member; and a means to retract said step, said retraction means attached inside said first tube member and inside said second tube member to retract said retractable step from an in use position to a retracted position.

7. A retractable step comprising:

a first tube member with a first end and a second end rigidly attachable to an underside of a vehicle in a horizontal position;

a second tube member with a first end and a second end with a slotted opening between said ends, said first tube member insertable and slidable within said slotted opening, such that said second tube member is generally perpendicular to and raises and lowers vertically over said first tube member;

a step platform attached to said second end of said second tube member; and a means of retracting said step, said retraction means raising and lowering said second tube member from a lower in use position to an upper retracted position.

8. The retractable step as set forth in claim 7 in which said step platform comprises a dual step, one step extending perpendicular outward from sides of said second tube member.

9. The retractable step as set forth in claim 7 further comprising a mounting tube, said mounting tube being rigidly attachable to said vehicle, said first end of said first tube member insertable into said mounting tube for attaching said retractable step to said vehicle.

10. The retractable step as set forth in claim 7 further comprising a chassis mount for attaching said second end of said first tube member to a chassis of said vehicle.

11. The retractable step as set forth in claim 7 in which said retraction means comprises a rotatable threaded rod attached to and extending between said first end and said second end within said slotted opening of said second tube member and threaded through a threaded bore on said first tube member located between said first end and said second end.

12. The retractable step as set forth in claim 11 further comprising a motor means to rotate said rotatable threaded rod to raise and lower said step platform.

13. A retractable step comprising:

a first tube member attachable to a vehicle;

a second tube member slidable over said first tube member, said second tube member comprising a tube member with a first end and a second end with a slotted opening through opposite sides of said tube member extending between said ends, said first tube member insertable and slidable within said slotted opening;

a step platform attached to an end of said second tube member; and a means of retracting said step platform by sliding said second tube member along said first tube member.

\* \* \* \* \*